United States Patent
Bush

(10) Patent No.: US 8,624,176 B2
(45) Date of Patent: Jan. 7, 2014

(54) DETECTOR ASSEMBLY COMPRISING A CAP ASSEMBLY INCLUDING A RADIALLY EXPANDABLE MEMBER

(75) Inventor: Michael L. Bush, Ravenna, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 366 days.

(21) Appl. No.: 12/981,721

(22) Filed: Dec. 30, 2010

(65) Prior Publication Data

US 2011/0155896 A1 Jun. 30, 2011

Related U.S. Application Data

(60) Provisional application No. 61/291,783, filed on Dec. 31, 2009.

(51) Int. Cl.
*H01J 40/14* (2006.01)

(52) U.S. Cl.
USPC ............................................. 250/239

(58) Field of Classification Search
USPC ........ 250/239, 361 R, 363.05, 363.09, 370.11
See application file for complete search history.

(56) References Cited

U.S. PATENT DOCUMENTS

| | | | |
|---|---|---|---|
| 5,742,057 A | 4/1998 | Frederick et al. | |
| 6,222,192 B1 | 4/2001 | Sekela et al. | |
| 6,359,282 B1 | 3/2002 | Sekela | |
| 6,781,134 B1 | 8/2004 | Murray et al. | |

*Primary Examiner* — Thanh Luu
*Assistant Examiner* — Renee Naphas
(74) *Attorney, Agent, or Firm* — Abel Law Group, LLP; Robert N. Young

(57) ABSTRACT

A detector assembly includes a cap assembly configured to close an end of a detector housing that is configured to contain a sensor therein, the cap assembly has a radially expandable member configured to expand radially within the detector housing and lock the position of the cap assembly relative to the detector housing.

18 Claims, 4 Drawing Sheets

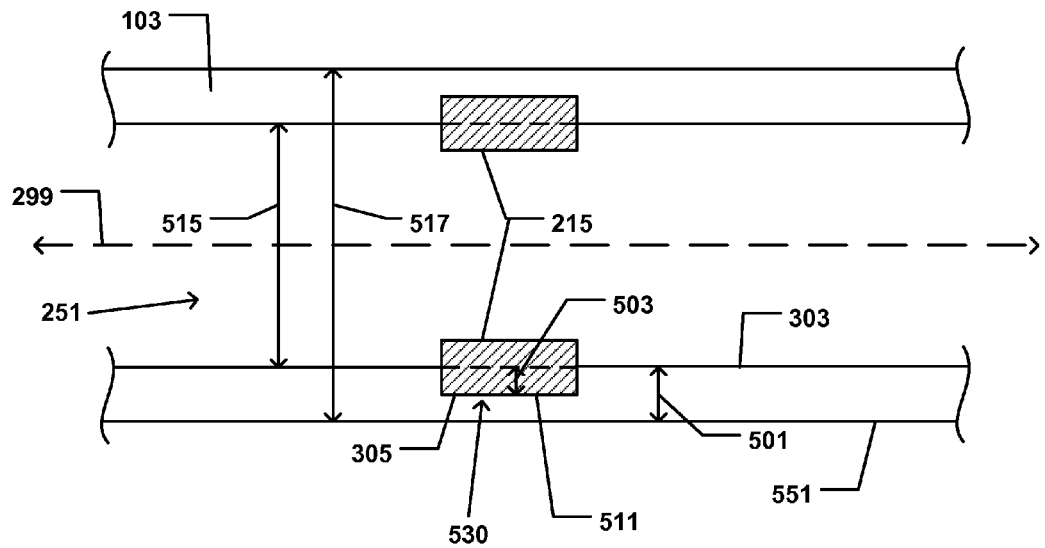
FIG. 5
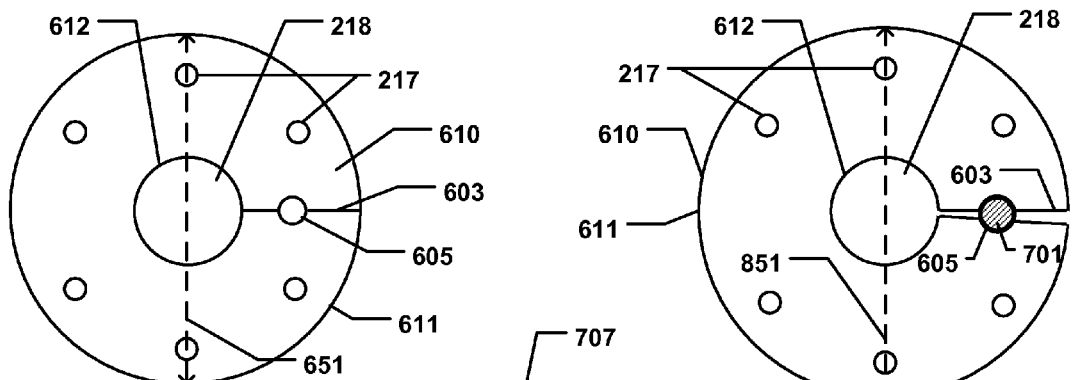
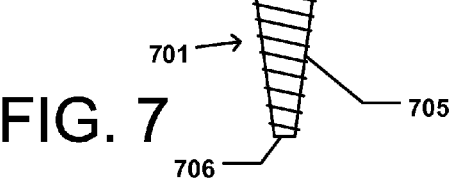
FIG. 6  FIG. 7  FIG. 8

DETECTOR ASSEMBLY COMPRISING A CAP ASSEMBLY INCLUDING A RADIALLY EXPANDABLE MEMBER

CROSS-REFERENCE TO RELATED APPLICATION(S)

The present application claims priority from U.S. Provisional Patent Application No. 61/291,783, filed Dec. 31, 2009, entitled "Detector Assembly for a Scintillation Article," naming inventor Michael L. Bush, which application is incorporated by reference herein in its entirety.

BACKGROUND

1. Field of the Disclosure

The following disclosure is directed to detector assemblies, and more particularly, a releasable cap assembly for a detector assembly.

2. Description of the Related Art

Radiation detector devices are used in a variety of industrial applications, for example, well logging in the oil and gas industry. Typically, the detectors have scintillator crystals made of an activated sodium iodide or other material effective for detecting certain types of radiation. Because the scintillator crystals are sensitive components, they are generally enclosed in casings or sleeves. The casings can include a window to permit radiation-induced scintillation light to pass out of the crystal package to a light-sensing device such as a photomultiplier tube (PMT). The photomultiplier tube converts the light photons emitted from the scintillator crystal into electrical pulses, which are shaped and digitized by associated electronics and may be registered as counts that are transmitted to analyzing equipment.

In certain applications, such as the well logging industry, scintillation detectors are useful for measuring gamma rays and neutrons emitted from surrounding rock strata. In fact, scintillation detectors can be used in drilling apparatuses themselves, giving rise to the common practice of measurement while drilling (MWD) (or logging while drilling). Nonetheless, MWD applications often take place in severe environments characterized by large amounts of heat, vibration and shock. Vibration and shock can cause the detector and/or the sensor to malfunction or fail.

Accordingly, the industry continues to need improvements in scintillation articles and PMT assemblies.

SUMMARY

According to a first aspect, a detector assembly includes a cap assembly configured to close an end of a detector housing configured to contain a sensor therein, the cap assembly includes a radially expandable member configured to expand radially within the detector housing and lock the position of the cap assembly relative to the detector housing.

According to another aspect, a detector assembly includes a detector housing, and a cap assembly configured to close an end of the detector housing, wherein the cap assembly has a first component configured to directly connect to an interior surface of the detector housing and lock at an axial position within an interior of the detector housing, and a second component configured to directly connect to the first component and indirectly connect to the detector housing.

In yet another aspect, a detector assembly includes a detector housing having an outer diameter (OD) and an inner diameter (ID) defining a cavity within the detector housing, wherein the detector housing is a thin-walled structure and the ID has a dimension of at least about 90% and not greater than about 99% of the dimension of the OD. The detector assembly further includes a cap assembly releasably coupled to an end of the detector housing.

According to still another aspect, a detector assembly including a thin-walled detector housing includes a sensor disposed within the detector housing, wherein the detector housing having an average side wall thickness of not greater than about 3.0 mm, and a cap assembly releasably coupled to an end of the detector housing opposite an end of the detector housing abutting the sensor.

In another aspect, a detector assembly including a thin-walled housing includes a sensor disposed within the detector housing, wherein the detector housing has an outer diameter (OD), and an inner diameter (ID) defining a cavity within the detector housing. The ID has a dimension of at least about 90% and not greater than about 99% of the dimension of the OD, and a cap assembly is releasably coupled to an end of the detector housing via a fastener.

In accordance with still another aspect, a detector assembly includes a sensor disposed within a detector housing and a cap assembly releasably connected to the detector housing. The cap assembly includes a radially expandable member, wherein the cap assembly is moveable between an open position and a closed position, and wherein in the closed position the detector assembly is sealed by the cap assembly and the radially expandable member is in an expanded position.

Another aspect includes a detector assembly having a sensor disposed within a detector housing and a cap assembly including a shield cap, a push plate, and a lock disk disposed between the shield cap and the push plate. In an open position, the shield cap is disengaged from the detector housing, and in changing the cap assembly from the open position to the closed position the shield cap engages the push plate.

BRIEF DESCRIPTION OF THE DRAWINGS

The present disclosure may be better understood, and its numerous features and advantages made apparent to those skilled in the art by referencing the accompanying drawings.

FIG. 5 includes a cross-sectional illustration of a portion of a detector housing and a radially expandable member in accordance with an embodiment.

FIG. 6 includes a top view of a lock disk in an unexpanded state in accordance with an embodiment.

FIG. 7 includes an illustration of an actuator for use with the lock disk in accordance with an embodiment.

FIG. 8 includes a top view of a lock disk in an expanded state in accordance with an embodiment.

The use of the same reference symbols in different drawings indicates similar or identical items.

DETAILED DESCRIPTION

The following is directed to a detector assembly, which can include a sensor, such as a photomultiplier tube (PMT) or other light sensor, which can be contained within the detector housing and optically coupled to a radiation detector, such as a scintillator. Accordingly, the embodiments of detector assemblies herein may be particularly suited for use with scintillation articles, and be used in conjunction with scintillator crystals. Such embodiments may be used in various industrial environments, including MWD applications, and thus can be ruggedized housing designs. Moreover, such embodiments can use releasably coupled components, making the detector assemblies field-serviceable.

Figure 1:
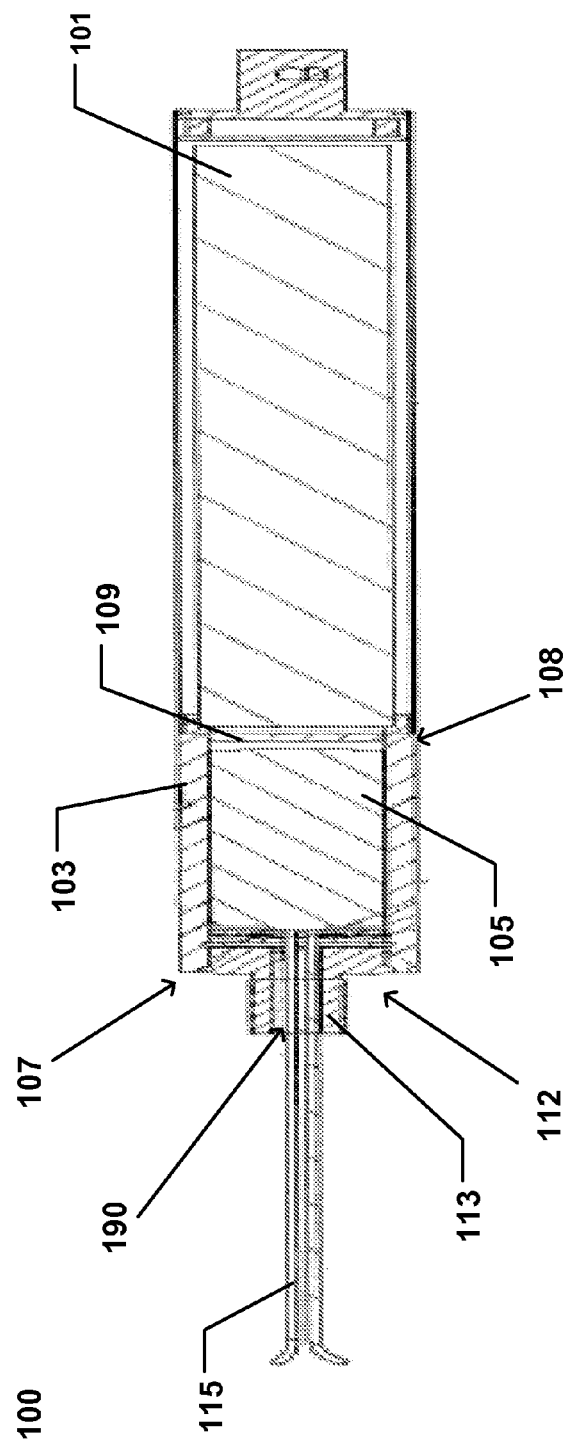
FIG. 1 includes a cross-sectional illustration of a scintillation article in accordance with an embodiment.

FIG. 1 includes a cross-sectional illustration of a scintillation article in accordance with an embodiment. In particular, the scintillation article 100 includes a radiation detector 101, which may be suitable for detecting particular types of radiation by virtue of a scintillator material. Various types of scintillator materials can be used, including inorganic materials, organic materials, and a combination thereof. In certain instances, the scintillator material can be a liquid material, or solid material (e.g., a crystalline material) or a combination thereof. According to one embodiment, the scintillator material can be a crystalline material, and may be a crystalline material including a halide material. Some such suitable scintillator crystals can include activated halide-containing materials, such as rare-earth halide materials and/or alkali halide materials. According to one embodiment, the scintillator crystal can be an activated halide crystal, for example, activated $LaBr_3$, $LaCl_3$, $GdI_3$, $GdBr_3$, and $LuI_3$. Still, in other embodiments, the scintillator crystal can be an activated iodide crystal, such as a thallium-activated sodium iodide crystal. Various activating elements can be provided as dopants within particular scintillator materials, including for example, cerium, thallium, europium, and the like.

The scintillation article 100 can further include a detector housing 103 for incorporation of a sensor 105 therein. The detector housing 103 can have a first end 107 that houses a cap assembly 112 for sealing the detector housing 103, and a second end 108 that is coupled to the radiation detector 101. The detector housing 103 can be a casing having a particular shape, and generally has a cavity as defined by an interior surface that is suitable for securing a sensor 105 therein.

The detector housing 103 can be made of a metal material, such as a refractory metal or metal alloy suitable for use in industrial environments. For example, suitable metals can include titanium, cobalt, chrome, molybdenum, aluminum, steel, nickel, and a combination thereof.

The sensor 105 disposed within the cavity of the detector housing 103 can be a radiation sensing device, and more particularly may be a device suitable for detection fluoresced radiation given off by the scintillator material. That is, when a particular type of radiation (e.g., gamma ray radiation) interacts with the scintillator, the scintillator fluoresces a particular type of radiation (e.g., light of a particular wavelength), which can be detected by the sensor 105. In one embodiment, the sensor 105 can be a photomultiplier tube (PMT). In other embodiments, the sensor 105 can include a hybrid PMT or a silicon photomultiplier (SiPM) device with associated electronics.

The sensor 105 can include electronics suitable for converting the fluoresced radiation emitted from the scintillator material into electrical pulses that may be registered as counts for analysis. Such electronics may include, among other things, a photocathode, an electron detector, an amplifier, a pre-amplifier, a discriminator, an analog-to-digital signal converter, or the like. Additionally, the sensor 105 can be a hybrid PMT.

As further illustrated, proximate to the end 108 within the detector housing 103, an optical coupling pad 109 can be provided for suitable optical coupling between the sensor 105 and the radiation detector 101. In one embodiment, the optical coupling pad 109 can be a UV-transparent silicone gel pad.

The detector housing 103 can be sealed via a cap assembly 112 coupled to the end 107 of the detector housing 103, such that the sensor 105 is secured within the interior of the detector housing 103. The cap assembly 112 can include multiple parts, including for example, a shield cap 113. As illustrated in FIG. 1, the cap assembly 112 can further include an opening 190, extending axially and facilitating the passage of wires 115 therethrough and out of the detector housing 103. The wires 115 can be electrically coupled to the electronics within the PMT and can be used to transmit signals to analyzing equipment.

Figure 2:
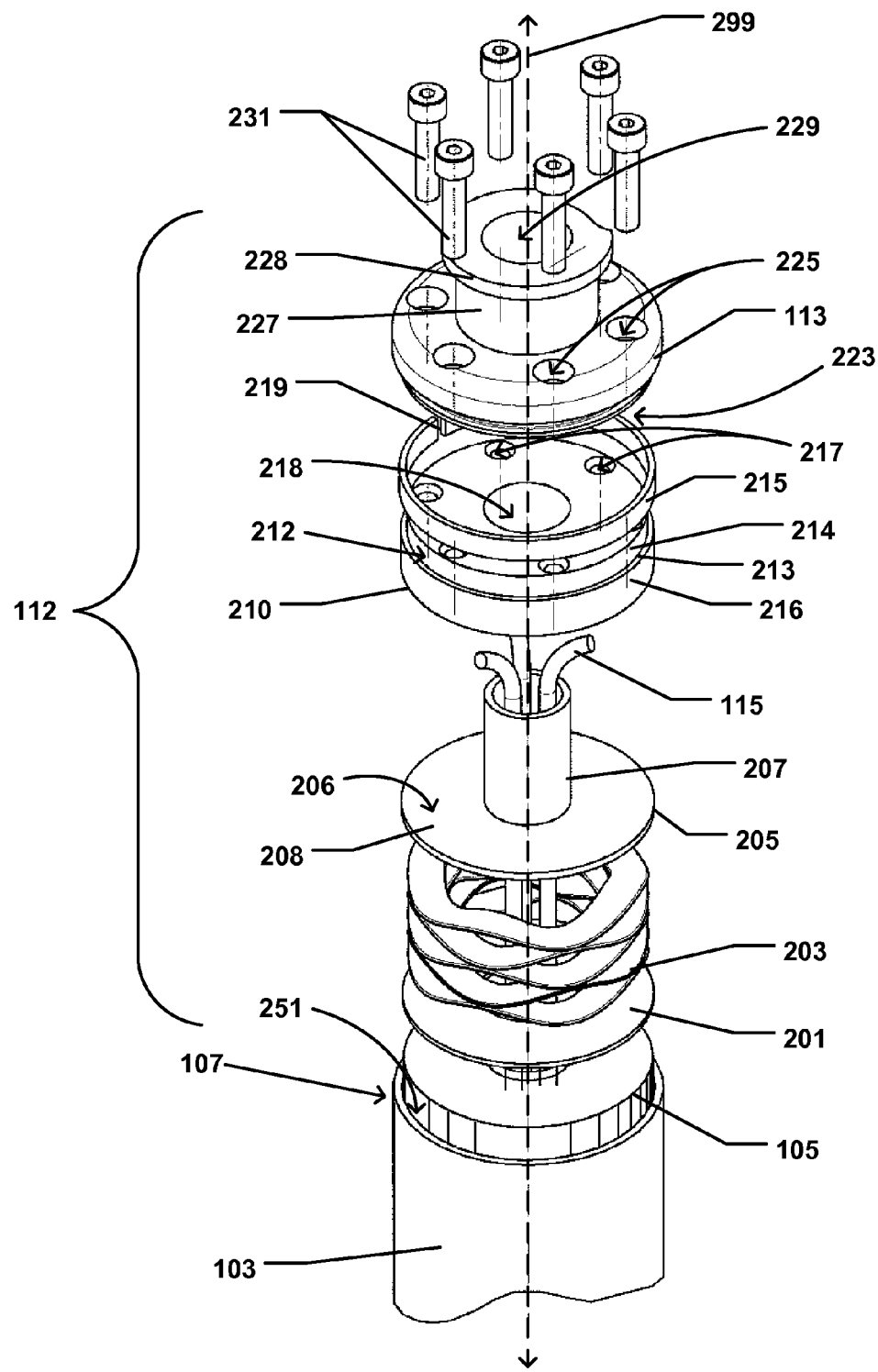
FIG. 2 includes an exploded view of a detector assembly including a cap assembly in accordance with an embodiment.

FIG. 2 includes an exploded view of a detector assembly including a cap assembly in accordance with an embodiment. As illustrated, the detector assembly can include the detector housing 103 as described in accordance with embodiments herein. Moreover, the detector assembly can include the sensor 105 having a shape and size configured to be contained within the detector housing 103, and particularly contained within a cavity 251 within the detector housing 103.

FIG. 2 illustrates components of the cap assembly 112 and particularly the manner in which the components of the cap assembly 112 may be combined to facilitate closing the end 107 of the detector housing 103. In particular, the cap assembly 112 can include a spacer 201 that may be configured to engage an upper surface of the sensor 105 when the cap assembly 112 is assembled and in a closed position. The spacer 201 may provide a suitable surface for engaging other components of the cap assembly 112.

The spacer 201 can be made of a suitable material, such as an inorganic material, an organic material, and a combination thereof. In one instance, the spacer 201 can be made of a metal or metal alloy. In particular instances, the spacer 201 can be made of steel, including for example, stainless steel. The spacer 201 may be used to evenly distribute the load of a biasing member 203 on adjacent components.

Additionally, while not illustrated, the cap assembly 112 can include a pad that may be disposed between the spacer 201 and the sensor 105, such that the pad is configured to directly engage an end of the sensor 105. The pad can be made of a soft material suitable for absorbing shocks and limiting physical strain on the sensor 105. For instance, the pad can include a polymer material, such as an elastomer.

As further illustrated, the cap assembly 112 can include a biasing member 203 that is configured to be disposed over the spacer 201 and engage an upper major surface of the spacer 201. The biasing member 203, as illustrated, can be in the form of a spring member, and may be used to facilitate biasing of other components of the cap assembly 112 against the sensor 105, thus urging the components in an axial direction away from the sensor 105. Moreover, the biasing member 203 may be used to facilitate proper operation between open and closed positions of the detector assembly, and more particularly, may be suitable for removal of particular components of the cap assembly 112 thus facilitating the field-serviceable design. That is, because the biasing member 203 is disposed between the cap assembly 112 and the sensor 105, the cap assembly 112 and the sensor 105 are biased against each other and urged in opposite directions, and thus once the cap assembly 112 is disengaged from the detector housing 103, the cap assembly 112 is urged axially from the detector housing 103, thus opening the end of the detector housing 103.

The biasing member 203 can be formed of a particular material, including for example, an inorganic material, such as a metal or metal alloy material. Alternatively, the biasing member 203 may be formed of an organic material, such as a polymer. In accordance with a particular embodiment, the biasing member 211 is made of a refractory metal or metal alloy, including for example, stainless steel, titanium, nickel, cobalt, chrome, aluminum or any combination thereof.

The cap assembly 112 can include a push plate 205, which can be configured to be seated over the biasing member 203, and more particularly, between the biasing member 203 and a radially expandable member as will be described herein. As illustrated, the push plate 205 can be formed such that it has a flange 208 having an upper surface 206 configured to engage components of the cap assembly 112 thereon. Additionally, the push plate 205 can include a hub 207 extending axially from the flange 208 along the longitudinal axis 299, which may be configured to engage other components of the cap assembly as will be described in more detain herein. Notably, the hub 207 can be formed such that it has a length suitable to engage and extend through other components of the cap assembly 112. Additionally, the push plate 205, and particularly the hub 207 can have a central opening extending axially through the entire height of the body configured to allow passage of the wires 115 therethrough.

The push plate 205 may be made of an inorganic material, organic material, or a combination thereof. Particularly suitable inorganic materials may include a metal or metal alloy material. Such metal or metal alloy materials may incorporate one or more transition metal elements. In one particular instance, the push plate 205 can consist essentially of stainless steel. Alternatively, the push plate 205 may be formed of an organic material, such as a polymer, and more particularly, a thermoset, thermoplastic, or elastomer.

As illustrated in FIG. 2, the cap assembly 112 can further include a lock disk 210. The lock disk 210 can be sized and shaped such that it may engage the push plate 205. For example, in certain positions (e.g., an open position), the lock disk 210 may be seated on the upper surface 206 of the flange 208 of the push plate 205. Additionally, the lock disk 210 may be formed such that it has a central opening 218 that is configured to engage at least a portion of the hub 207 therein. For example, the hub 207 can extend axially along the longitudinal axis 299 through the central opening 218 of the lock disk 210. Additionally, the central opening 218 may permit passage of other components, such as the wires 115.

As illustrated, in accordance with one embodiment, the lock disk 210 may include a groove region 212 that may be sized and shaped to engage a component of the cap assembly 112 as will be described in more detail herein. In particular, the groove region 212 can be a region at the external, peripheral surface of the lock disk 210 that has a different dimension as compared to other regions along the external, peripheral surface of the lock disk 210. In particular, the groove region 212 can have a ledge surface 213 extending radially inward, in a direction perpendicular to the longitudinal axis 299 and defining a step between a lower perimeter surface 216 and an upper perimeter surface 214. As illustrated, the upper perimeter surface 214 of the lock disk 210 and particularly of the groove region 212 can define an exterior surface having a smaller dimension (i.e., circumference) as compared to the lower surface 216. The difference in external dimensions between the lower perimeter surface 216 and upper perimeter surface 214 facilitates the formation of the groove region 212 and accommodation of a component of the cap assembly 112 therein.

Moreover, the lock disk 210 can include openings 217 spaced apart from the central opening 218 and situated at regular intervals throughout a circumference of the lock disk 210. In particular, the openings 217 can extend axially through the full of the height of the lock disk 210 along the longitudinal axis 299. The openings 217 may be formed to facilitate engagement of the fasteners 231 therein and thereby facilitate coupling between one or more components of the cap assembly 112.

The lock disk 210 may be formed of an inorganic material, an organic material, or a combination thereof. In particular embodiments, the lock disk 210 may be formed of the same material as the push plate 205.

As further illustrated, the cap assembly 112 can include a radially expandable member 215. The radially expandable member 215 can be an annular-shaped member configured to engage the lock disk 210 within the groove region 212. In particular, the radially expandable member 215 can be formed such that is configured to be seated on the ledged surface 213 of the lock disk 210 in a closed position of the detector assembly. As will be appreciated, the radially expandable member can change diameters, expanding radially, such that upon placement of particular components (e.g., the lock disk 210 and the radially expandable member 215) of the cap assembly 112 at certain positions within the cavity 251 of the detector housing 103, the radially expandable member 215 may change dimensions (e.g., expand in a radial direction) and fix the components of the cap assembly 112 at an axial position within the detector housing 103.

In certain instances, the radially expandable member 215 can be a lock ring, having a generally annular shape and a central opening configured to engage a portion of the lock disk 210 therein. As illustrated, and in accordance with an embodiment, the radially expandable member 215 can be a split ring having a split 219 extending axially along the longitudinal axis 299. One particular embodiment may utilize a Hoopster™ retaining ring, available from Smalley Steel Ring Company.

The radially expandable member can be formed of an inorganic material, such as a metal or metal alloy. In particular instances, the radially expandable member 215 can be formed of a metal alloy comprising a transition metal element. For example, in one embodiment, the radially expandable member 215 can be made of steel such as stainless steel. In one particular embodiment, the radially expandable member 215 consists essentially of steel.

The cap assembly 112 can further include a shield cap 113 that may be sized such that it is configured to fit over the end 107 of the detector housing 103 and facilitate closing of the detector housing 103. As illustrated, the shield cap 113 may include a bottom surface 223 that is configured to engage the upper surface of the lock disk 210 in certain positions, such as in an open position. Moreover, the shield cap 113 can include a central opening 229 extending along the longitudinal axis 299, which may extend through the entire body of the shield cap 113. In particular, the central opening 229 may facilitate extension of the wires 115 therethrough, such that the wires 115 can extend outside the detector housing 103.

The shield cap 113 can include a protrusion 227 extending axially from the body along the longitudinal axis 299, which may facilitate user manipulation of the shield cap 113 during assembly and disassembly of the cap assembly 112. As further illustrated, the protrusion 227 can include a flange 228 which may further facilitate user manipulation of the shield cap 113.

As further illustrated, the shield cap 113 can include openings 225 formed to facilitate engagement of the fasteners 231 therein. As such, the openings 225 may align with openings 217 within the lock disk 210, such that fasteners 231 may be directly engaged with the shield cap 113 and extend into the lock disk 210, thereby directly coupling the lock disk 210 and shield cap 113 to each other.

The shield cap 113 may be formed of an inorganic material, such as a metal or metal alloy. In particular, the shield cap 113 may be formed of a metal alloy incorporating transition metal elements. In certain instances, the shield cap 113 can be made of stainless steel, such that it consists essentially of stainless steel. In other designs, the shield cap 113 can be made of a titanium-containing metal alloy, including, for example, Ti-6Al-4V metal alloy.

Figure 3:
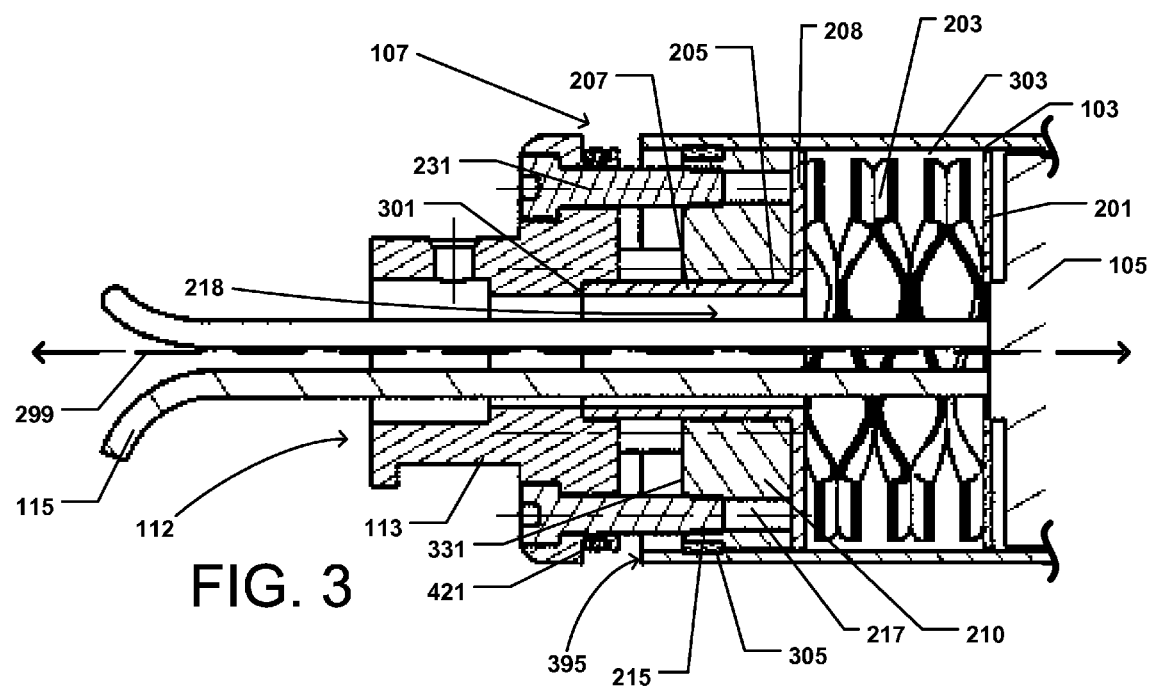
FIG. 3 includes a cross-sectional view of a portion of a detector assembly including the cap assembly in an open position in accordance with an embodiment.
Figure 4:
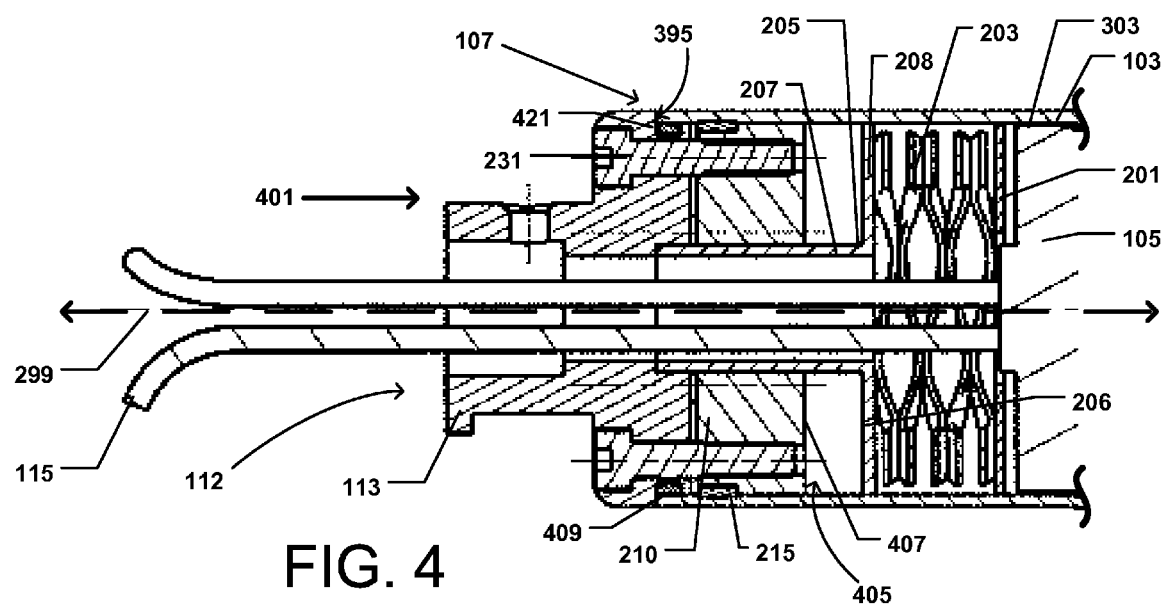
FIG. 4 includes a cross-sectional view of a portion of a detector assembly including the cap assembly in a closed position in accordance with an embodiment.

FIGS. 3 and 4 include cross-sectional illustrations of portions of the detector assembly demonstrating the operation of the cap assembly 112. In particular, FIGS. 3 and 4 demonstrate aspects of the releasable coupling mechanism utilized by the cap assembly to facilitate formation of a field-serviceable detector assembly.

FIG. 3 includes a cross-sectional image of a portion of a detector assembly and cap assembly in accordance with an embodiment. In particular, FIG. 3 illustrates a cap assembly 112 as provided in an open position, and particularly a partially open position, with respect to the detector housing 103. In the open position, the cap assembly 112 can be positioned with respect to the detector housing 103, such that the end 107 of the detector housing 103 is not closed, and more particularly a flange surface 421 of the shield cap 113 is disengaged and axially spaced apart from an end surface 395 of the detector housing 103.

As illustrated, the cap assembly 112 can be assembled such that the spacer 201 is disposed between the sensor 105 and the biasing member 203. The biasing member 203 can be disposed between the sensor 105 and the radially expandable member 215 of the cap assembly 112, and more particularly, between the sensor 105 and lower surface of the flange 208 of the push plate 205 to facilitate biasing of the push plate 205, lock disk 210, radially expandable member 215, and shield cap 113. In particular instances, particularly in a partially open position and a closed position, the push plate 205, lock disk 210, radially expandable member 215, and shield cap 113 have an axial force applied by the biasing member 203 such that the components are urged in a direction toward the end 107 of the detector housing 103. As such, when moving the cap assembly 112 between an open position and a closed position, the biasing member may change position, and more particularly, change dimensions of height as measured axially along the longitudinal axis 299, which facilitates coupling and decoupling of the cap assembly 112 from the detector housing 103.

The push plate 205, and particularly the flange 208, may be formed to fit within the cavity 251 of the detector housing 103 and be in direct contact with a lower surface of the lock disk 210 when the cap assembly 112 is in the open position based on the pressure exerted by the biasing member 203 on the rear surface of the flange 208. As further illustrated, the hub 207 of the push plate 205 can extend axially along the longitudinal axis 299 and through the central opening 218 of the lock disk 210. In particular embodiments, the hub 207 can be formed to have a sufficient length such that it extends through the entire height of the lock disk 210 and protrudes beyond an upper surface 331 of the lock disk 210, such that it is configured to engage a portion of the shield cap 113.

As further illustrated, the lock disk 210 can include the radially expandable member 215, which may be configured to radially expand at a particular position within the interior of the detector housing 103, thereby locking the axial position of the radially expandable member 215 and the lock disk 210 along the longitudinal axis 299 within the detector housing 103. While such features will be described in more detail herein, FIG. 3 illustrates that the radially expandable member 215 may be engaged within surface feature 305, such as a groove, formed within the interior surface 303 of the detector housing 103, thereby facilitating locking of the axial position of the radially expandable member 215 and lock disk 210 with respect to the detector housing 103.

It will be appreciated, that upon initial insertion of the lock disk 210 and the radially expandable member 215 into the cavity of the detector housing 103, the radially expandable member 215 may be in a compressed state within the groove region 212 of the lock disk 210. Upon insertion of the lock disk 210 to a suitable axial distance, the radially expandable member 215 may be aligned with certain surface features (e.g. a groove) within the interior surface 303 of the detector housing 103, allowing the radially expandable member 215 to expand and thereby engage the detector housing 103. As such, the lock disk 210 and the radially expandable member 215 can be directly coupled to the detector housing 103 and the axial position of the lock disk 210 and radially expandable member 215 are fixed with respect to the detector housing 103.

As further illustrated, the shield cap 113 can include a central opening 229, which may be aligned axially with the central opening 218 of the lock disk 210 to facilitate passage of the wires 115 through the cap assembly 112 and external to the detector housing 103. As further illustrated, the hub 207 of the push plate 205 can be configured to extend axially along the longitudinal axis 299 and have an upper surface configured to engage a surface 301 of the shield cap 113, such that upon movement of the shield cap 113 from one axial position to a different axial position along the longitudinal axis 299, the push plate 205 can be actuated by the shield cap 113 and moved correspondingly between the axial positions. Moreover, as illustrated in FIG. 3, fasteners 231 can extend through the openings 225 of the shield cap 113 and further engage the lock disk 210 within the openings 217, facilitating direct connection between the lock disk 210 and shield cap 113.

FIG. 4 includes a cross-sectional illustration of a detector assembly and cap assembly in a closed position in accordance with an embodiment. Notably, in the closed position, the shield cap 113 has been moved along the longitudinal axis 299 in the direction 401 such that the flange surface 421 of the shield cap 113 is abutting and directly contacting the end surface 395 of the detector housing 103. In particular, closing the end of the detector housing 103 can be facilitated by the movement of the fasteners 231 into the openings 217 of the lock disk 210 such that the shield cap 113 is fastened to the lock disk 210 and thereby directly connected to the lock disk 210.

Moreover, the closure of the cap assembly 112 in the direction 401 further facilitates axial movement of the push plate 205 in the direction 401 as the surface 301 of the shield cap 113 is engaged with the hub 207 of the push plate 205. As such, a gap 405 can be formed between the upper surface 206 of the flange 208 of the push plate 205 and a lower surface 407 of the lock disk 210. The gap 405 may be referred to as a working height, which is a measure of a suitable distance along the longitudinal axis 299 between the lower surface 407 of the lock disk 210 and the upper surface 206 of the push plate that facilitates proper coupling between the shield cap 113 and the lock plate 210 as well as proper biasing of the biasing member 203. That is, as further illustrated, in a change between the open position illustrated in FIG. 3 and the closed position illustrated in FIG. 4, the shield cap 113 is moved in the direction 401, which in turn moves the push plate 205 in the direction 401 and the biasing member 203 is compressed such that the push plate 205, lock disk 210 and shield cap 113 of the cap assembly 112 are suitably biased away from the sensor 105 contained within the detector housing 103.

In accordance with an embodiment, the cap assembly 112 can be formed such that it includes components that are directly connected to the detector housing 103 and components that are indirectly connected to the detector housing 103 to facilitate closing the end 107 of the detector housing 103. In particular, the cap assembly 112 can include components such as the lock disk 210 and radially expandable member 215 that are configured to be directly connected to the detector housing 103. The lock disk 210 can be directly connected to the detector housing 103 via the radially expandable member 215, which locks the axial position of the lock disk 210 with respect to the detector housing 103. The shield cap 113 can be configured to be directly connected to the lock disk 210 via fasteners 231. Notably, the shield cap 113 can be configured to be indirectly connected to the detector housing 103, since without the positioning of the lock disk 210 within the detector housing 103, the axial position of the shield cap 113 could not be fixed with respect to the detector housing 103.

In particular, the fasteners 231 can be spaced apart from the surfaces of the detector housing 103. As such, the fasteners 231 are configured to directly connect the shield cap 113 and lock disk 210 to each other and may be completely disengaged from the detector housing 103. In short, the fasteners 231 may be oriented such that they extend along the longitudinal axis 299 between the shield cap 113 and push plate 205 and may be disengaged from direct connection with the detector housing 103.

The cap assembly 112 may further include a gap 409 formed between a surface 421 of the shield cap and an interior surface 303 of the detector housing 103. The gap 409 may facilitate engagement of a sealing member therein. Particularly suitable sealing members may include an o-ring or the like, such that the end 107 of the detector housing 103 is suitably sealed against the shield cap 113.

FIG. 5 includes a cross-sectional illustration of a portion of the detector housing and radially expandable member in accordance with an embodiment. It will be appreciated that certain other components have been removed from the figure for simplicity's sake. In accordance with embodiments herein, the detector housing 103 can be a thin-walled structure, wherein the inner diameter 515 of the detector housing 103 is a particular percentage of the value of the outer diameter 517. Notably, the industry continues to seek detector housings capable of holding the largest possible sensors, and accordingly, detector housings utilizing thinner wall thickness to accommodate larger sensors. In accordance with an embodiment, the detector housing 103 can have an outer diameter 517 within a range between about 15 mm and about 60 mm, such as between about 18 mm and about 60 mm, or even between about 20 mm and about 60 mm.

As noted herein, the detector housing 103 can be a thin-walled structure, such that the inner diameter 515 may be within a range between about 15 mm and about 60 mm, such as between about 16 mm and about 59 mm, or even between about 17 mm and about 58 mm.

The thin-walled structure of the detector housing 103 can be defined such that the inner diameter 515 has a dimension of at least about 90% and not greater than about 99% of the dimension of the outer diameter 517. In fact, embodiments herein may utilize a detector 103 wherein the inner diameter 515 has a dimension of at least 92% and not greater than about 99%, such as on the order of at least about 93% and not greater than about 99%, at least about 94% and not greater than about 99%, or even at least about 96% and not greater than about 99% of the dimension of the outer diameter 517.

In more particular terms, the detector housing 103 may have an average side wall thickness 501 as measured between the interior surface 303 and exterior surface 551 in a direction perpendicular to the longitudinal axis 299 that is not greater than about 3.0 mm. In other instances, average side wall thickness 501 can be not greater than about 2.5 mm, not greater than about 2.0 mm, not greater than about 1.5 mm, not greater than about 1.25 mm, not greater than about 1.0 mm, not greater than about 0.9 mm, or even greater than about 0.8 mm. Still, in particular embodiments, the average side wall thickness 501 of the detector housing 103 can be within a range between about 0.2 mm and about 3.0 mm, between about 0.2 mm and about 2.5 mm, such as between about 0.3 mm and about 2.0 mm, or between about 0.3 mm and 1.5 mm, between about 0.3 mm and about 1 mm, or even between about 0.3 mm and 0.8 mm.

As further illustrated in FIG. 5, the radially expandable member 215, which is a component configured to be directly connected to the detector housing 103, can be connected to the detector housing 103 via a complimentary engagement structure 530. In accordance with an embodiment, the complimentary engagement structure 530 can be formed via interlocking surfaces between two components, for example, the radially expandable member 215 and the interior surface 303 of the detector housing 103. In particular, the interior surface 303 of the detector housing 103 can be formed to include a surface feature 305, which can be a groove in particular designs, that extends radially outward into the side wall of the detector housing 103. The surface feature 305 can be sized and shaped, such that it is configured to engage at least a portion of the radially expanding member 215 therein.

As will be appreciated, the surface feature 305 may extend for a fraction of the perimeter (i.e., circumference) of the interior surface 303 about the longitudinal axis 299. Alternatively, the surface feature 305 can extend around the entire perimeter (i.e., circumference) of the interior surface 303 of the detector housing 103 about the longitudinal axis 299. It will be appreciated that the radially expandable member 215 can be engaged within the surface feature 305 through substantially the entire perimeter of the inner surface 303 with the exception of a small radial gap that may exist.

In certain designs, the detector housing 103 can be formed such that the surface feature 305 (e.g., the groove) has a depth 503 that can be measured between the interior surface 303 and a bottom surface 511 of the groove 305, which may be a particular fraction of the average side wall thickness 501. As illustrated, the depth 503 can be measured in a direction that is substantially perpendicular to the longitudinal axis 299. In accordance with an embodiment, the depth 503 of the surface feature 305 can be at least about 5% of the sidewall thickness 501. In other instances, the surface feature 305 can have a greater depth 503, such as on the order of at least about 10%, at least about 12%, at least about 15%, or even at least about 18% of the average side wall thickness 501. Still, in particular instances, the surface feature 305 can have a depth 503 that is within a range between about 5% and about 60%, such as between about 10% and about 60%, between about 15% and about 60%, between about 20% and about 60%, between about 30% and about 60%, between about 40% and 60%, between about 45% and about 60%, or even between about 50% and about 60% of the average side wall thickness 501 of the detector housing 103.

In certain designs, the detector housing 103 can be formed such that the surface feature 305 (e.g., the groove) has a depth 503 that can be at least about 0.15 mm, such as at least about 0.18 mm, at least about 0.2 mm, at least about 0.25 mm, or even at least about 0.3 mm. In particular instances, surface feature 305 can have a depth 503 that can be within a range between about 0.15 mm and about 2 mm, such as between about 0.15 mm and about 1.5 mm, between about 0.18 mm and about 1 mm, or even between about 0.2 mm and about 0.5 mm.

FIGS. 6-8 include illustrations of certain components in accordance with an alternative design of the cap assembly. In accordance with at least one alternative design, the cap assembly 112 may utilize a different radially expandable member as compared to the previously described lock ring. For example, the cap assembly 112 may utilize a lock disk that has radially expandable capabilities. That is, the lock disk may be actuated to facilitate radial expansion of at least a portion of the body of the lock disk to fix the axial position of the lock disk within the detector housing 103 and facilitate a direct connection between the lock disk and detector housing 103.

FIG. 6 includes a top view of a lock disk in accordance with an embodiment. In particular, the lock disk 610 can include a central opening 218 and openings 217 configured to engage fasteners therein as described in accordance with embodiments herein. Notably, the lock disk 610 can include a groove 603 extending radially between an outer surface 611 defining the outer diameter of the lock disk 610 and an inner surface 612 defining the central opening 218 of the lock disk 610. Moreover, the lock disk 610 can include an opening 605 connected to and intersecting the groove 603 that may facilitate engagement of an actuator therein.

FIG. 7 includes a side view illustration of an actuator in accordance with an embodiment. In particular, the actuator 701 can include an upper end 707 and a lower end 706, wherein the upper end can include a head portion 703 which is connected to a shaft 705 having a tapered shape. In certain designs, the width of the actuator 701 can be narrower at the end 706 than the width of the actuator 701 at the end 707. It will be appreciated, that the actuator can be a pin, bolt, screw, or the like having a particular shape which may be engaged within the opening 605 of the lock disk 610.

FIG. 8 includes a top view illustration of a lock disk in accordance with an embodiment. In particular, the lock disk 610 is illustrated in a different position as compared to the position of the lock disk 610 of FIG. 6. Notably, the actuator 701 is disposed within the opening 605, which facilitates opening and separation of the gap 603. As such, incorporation of the actuator 701 within the opening 605 can facilitate changing (i.e., increasing) the diameter 851 of the lock disk 610 as compared to the diameter 651 of the lock disk 610 illustrated in FIG. 6 without the actuator 701 disposed within the opening 605. That is, the actuator 701 can be used to change the diameter of the lock disk 610 such that the diameter 851 can be greater than the diameter 651.

In one particular embodiment, the actuator 701 can be a threaded fastener that can be threaded into the opening 605 of the lock disk 610, which can facilitate radial expansion of the lock disk 610 and an increase in the diameter of the body of the lock disk 610. During assembly, the lock disk 610 may be disposed within the cavity 251 of the detector housing 103, and upon proper placement of the lock disk 610 within the cavity 251, the actuator 701 may be placed within the opening 605. Upon sufficient engagement of the actuator 701 within the opening 605, the gap 603 can be urged to widen thus causing radial expansion of the lock disk 610. Radial expansion of the lock disk 610 can facilitate direct connection between the interior surface 303 of the detector housing 103 and the lock disk 610, thus fixing the axial position of the lock disk 610 within the cavity 251 of the detector housing 103.

The components and methods disclosed herein represent a departure from the state-of-the-art. Generally, conventional scintillation articles include a sensor having wires extending from the end of the detector housing through a unitary shield cap. Such designs typically closed the detector housing in a permanent manner, via welding or epoxies. Alternatively, some conventional detector housings may have utilized fasteners, but generally fasteners could only be used with detector housings having substantial wall thicknesses. In the past, servicing of detector assemblies was not generally conducted, but if servicing was needed, extraction of the sensor from the housing included destructively removing the shield cap and extracting the internal components from the housing. As can be appreciated, such a process may results in additional costs and potential damage to sensitive components, such as the sensor.

By contrast, the detector assembly disclosed herein includes a unique design including a combination of components allowing for operation of the article in industrial environments while further providing a field-serviceable design that utilizes a releasable coupling arrangement between a cap assembly and detector housing that can be used in large sensor and thin-walled detector housing designs. Releasable coupling attachments herein are field-serviceable designs allowing for opening and closing of the detector assembly using common hand tools. Notably, the embodiments described herein include a multi-component cap assembly, including a shield cap, lock disk, push plate, biasing member, and a radially expandable member configured for use with each other, and engagement with particular surface features of the detector housing to form a releasably coupling assembly. Moreover, the components described herein also facilitate operations in industrial environments, providing shock absorption capabilities and integrity in environments having varying temperatures.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The foregoing disclosure does not limit the scope or meaning of the claims and should not be interpreted as such. In addition, in the foregoing description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the description and figures, with each claim standing on its own as defining separately claimed subject matter.

What is claimed is:
1. A detector assembly comprising:
a sensor disposed within a detector housing; and
a cap assembly releasably connected to the detector housing and comprising a radially expandable member, wherein the cap assembly is moveable between an open position and a closed position, and wherein in the closed position the detector assembly is sealed by the cap assembly and the radially expandable member is in an expanded position.

2. The detector assembly of claim 1, wherein the radially expandable member is configured to expand radially into a groove within an interior surface of the detector housing.

3. The detector assembly of claim 2, wherein the detector housing has an average side wall thickness and the groove has a depth of at least about 5% of the average side wall thickness.

4. The detector assembly of claim 3, wherein the groove extends around an entire circumference of the interior surface of the detector housing.

5. The detector assembly of claim 1, wherein the detector housing has an outer diameter (OD) and an inner diameter (ID) defining a cavity within the detector housing, wherein the ID has a dimension of at least about 90% and not greater than about 99% of the dimension of the OD.

6. The detector assembly of claim 1, wherein the cap assembly further comprises:
- a shield cap;
- a push plate; and
- a lock disk disposed between the shield cap and the push plate, wherein:
  - in an open position the shield cap is disengaged from the detector housing; and
  - in changing the cap assembly from the open position to the closed position the shield cap engages the push plate.

7. The detector assembly of claim 1, wherein the sensor comprises a wire extending axially through the cap assembly external to the detector housing.

8. The detector assembly of claim 1, further comprising a lock disk, wherein the lock disk is configured to be moved between the open and closed positions via an actuator.

9. The detector assembly of claim 8, wherein the actuator has a tapered shape configured to separate portions of the lock disk from each other.

10. The detector assembly of claim 1, wherein the cap assembly comprises a lock disk configured to lock an axial position of a portion of the cap assembly within an interior of the detector housing.

11. The detector assembly of claim 1, wherein the radially expandable member comprises a lock ring.

12. The detector assembly of claim 11, wherein the cap assembly comprises a lock disk configured to lock an axial position of a portion of the cap assembly within an interior of the detector housing, and the lock ring is configured to engage an exterior surface of the lock disk.

13. The detector assembly of claim 11, wherein the lock ring is a split ring.

14. The detector assembly of claim 11, wherein the cap assembly further comprises a lock disk configured to lock an axial position of a portion of the cap assembly within an interior of the detector housing, and a shield cap.

15. The detector assembly of claim 14, wherein the lock disk is a first component directly connected to the detector housing, and the shield cap is a second component indirectly connected to the detector housing.

16. The detector assembly of claim 14, wherein the cap assembly further comprises a push plate, and the lock disk is disposed between the push plate and the shield cap in the closed position.

17. The detector assembly of claim 14, wherein the shield cap is connected to the lock disk.

18. The detector assembly of claim 1, wherein the radially expandable member is configured to engage a surface feature at an interior surface of the detector housing.

* * * * *